United States Patent [19]

Boles

[11] Patent Number: 4,563,686
[45] Date of Patent: Jan. 7, 1986

[54] RANGE/DOPPLER SHIP IMAGING FOR ORDNANCE CONTROL

[75] Inventor: Sol Boles, Syosset, N.Y.

[73] Assignee: Grumman Aerospace Corporation, Bethpage, N.Y.

[21] Appl. No.: 389,368

[22] Filed: Jun. 17, 1982

[51] Int. Cl.$^4$ .............................................. G01S 13/90
[52] U.S. Cl. ................... 343/17; 343/5 CM; 343/7 ED
[58] Field of Search ............... 343/5 CM, 7.7, 11 R, 343/7 A, 17; 364/516, 517

[56] References Cited

U.S. PATENT DOCUMENTS

| | | | |
|---|---|---|---|
| 2,996,706 | 8/1961 | Newell et al. | 343/7 ED |
| 3,453,619 | 7/1969 | Wright | 343/8 |
| 3,610,901 | 10/1971 | Lynch | 343/5 DP X |
| 3,733,603 | 5/1973 | Johnston | 343/55 A |
| 3,735,400 | 5/1973 | Sletten et al. | 343/7.7 |
| 3,798,425 | 3/1974 | Heard et al. | 343/5 DP X |
| 3,806,929 | 4/1974 | Moore | 343/5 SA |
| 3,983,558 | 7/1976 | Rittenbach | 343/7.7 |
| 3,987,440 | 10/1976 | Danzer | 343/7 A |
| 3,987,442 | 10/1976 | McLeod, Jr. | 343/7.7 |
| 3,993,994 | 11/1976 | Goggins | 343/5 CM |
| 4,068,231 | 1/1978 | Wilmot | 343/5 CM |
| 4,086,590 | 4/1978 | Goggins, Jr. | 343/5 CM |
| 4,101,890 | 7/1978 | Goyard | 343/8 |
| 4,101,891 | 7/1978 | Jain et al. | 343/17.2 PC |
| 4,134,113 | 1/1979 | Powell | 343/5 CM |

Primary Examiner—T. H. Tubbesing
Assistant Examiner—Gilberto Barrón, Jr.
Attorney, Agent, or Firm—Richard G. Geib; Daniel J. Tick; Bernard S. Hoffman

[57] ABSTRACT

Distortions inherent in the formation of a range/doppler image by an airborne Synthetic Aperture Radar (SAR) of a ship under the influence of roll, pitch, and yaw motions characteristic of sea state conditions are removed in conjunction with a least squares linear regression solution to doppler processed interferometric azimuth angle data derived from ship radar reflections, resulting in a scaled high resolution range/doppler image representative of the true range/cross range (azimuth) distribution of the ship, so that continuous automatic tracking of a cursor imbedded in a single designated resolution cell of the ship's displayed image, essential to carrying out precision standoff command weapon guidance to that selected ship target cell, can be accomplished.

15 Claims, 8 Drawing Figures

DOPPLER VERSUS AZIMUTH ANGLE FOR $+W_{zz}$ AND $+W_{yy}$

DOPPLER PROCESSED IMAGE FOR $+W_{zz}$ AND $+W_{yy}$

RANGE/DOPPLER SHIP IMAGING FOR ORDNANCE CONTROL

The Government has rights in this invention pursuant to contract N00019-79-C-0075 awarded by the Department of the Navy.

BACKGROUND OF THE INVENTION

The present invention relates to radar controlled weapons systems and, more particularly, to a method and apparatus for generating real-time high resolution Synthetic Aperture Radar (SAR) imagery from an airborne platform of a translating ship under the influence of roll, pitch, and yaw motions characteristic of sea state conditions.

A highly resolved ship image on an airborne display permits targeting to a particular part of the ship for the purpose of standoff command guidance weapon delivery. As such, this invention relates to airborne SAR systems used for generating real-time high resolution imagery of a ship target under the influence of sea state conditions and for accurately measuring and tracking the range and azimuth angle of a designated resolution cell within the aforesaid displayed target area so as to enable the accurate delivery of an air-to-ground missile or glide bomb from the SAR bearing aircraft to the ship target. The manner of weapon guidance depends upon reducing to zero the relative range and azimuth angle between weapon and designated target resolution cell.

Existing airborne synthetic aperture radar systems have the capability for producing a high resolution image of stationary ground targets by virtue of the rotational motion of the SAR with respect to the target field. High resolution in both range and cross-range (azimuth) directions are achieved with short-pulse radar techniques for range resolution, and by digital signal doppler processing for azimuth resolution, so as to produce a two-dimensional image. The application of such known SAR processing techniques to a ship at sea, however, can readily produce distorted and improperly focused ship imagery, precluding ship recognition, because of ship rotational motions brought about by sea state conditions.

A system for ameliorating some of the adverse effects brought about by ship rotational motions is described in a commonly assigned copending United States patent application of Sol Boles, Ser. No. 389,367, filed concurrently herewith, entitled "Range/Azimuth Ship Imaging For Ordnance Control", the disclosure of which is incorporated herein by reference. The disclosed invention provides an undistorted two-dimensional image of the ship from a direct plot of range versus interferometrically determined azimuth angle of all essential scatterers comprising the ship. Notwithstanding the advantages achieved in conjunction with the disclosed invention, it does have certain operational limitations and drawbacks in certain applications. For example, the aforementioned techniques may not be capable of generating SAR imagery of high quality when the ship target is located in a high sea state environment because of the resulting degradation in the signal to noise ratio.

The invention disclosed herein is related to that described in the aforementioned application of Boles, entitled "Range/Azimuth Ship Imaging For Ordnance Control", but by a unique processing implementation, is capable of achieving a significant advantage in ship image quality and signal to noise ratio. The latter advantage, in turn, permits operation to greater ranges than would otherwise be possible by the techniques described in "Range/Azimuth Ship Imaging For Ordnance Control" for given transmitter and antenna parameters. This advantage is brought about by processing and displaying a high resolution range/doppler image of the ship target, with the distortions inherent in such a presentation due to ship scatterer rotational motions brought about by sea state conditions removed in accordance with the teachings of this invention, rather than processing and displaying a range/interferometrically determined azimuth angle image.

As those skilled in the art will recognize, the range/doppler representation could have a very substantial signal to noise advantage over the range/azimuth approach to imagery because of the image quality limitations brought about by angle glint errors associated with the latter.

It is accordingly an object of the present invention to provide a method and apparatus for generating high resolution synthetic aperture radar displayed imagery from an airborne platform of a ship under the influence of sea state conditions.

It is another object of the present invention to provide a method and apparatus for determining the cross line-of-sight relative velocity associated with aircraft and ship rotational motions requisite to achieving prescribed cross-range (azimuth) resolution in the displayed image representation of the ship.

It is a still further object of the present invention to provide a method and apparatus for eliminating the distortions inherent in range/doppler ship imagery brought about by ship rotational motions accompanying sea state conditions by forming a scaled SAR high resolution range/doppler image projection of the ship on the basis of interferometric azimuth angle measurements derived from doppler processed range sampled data, so as to permit the cursoring and tracking of a particular range/doppler resolution cell of the ship target for the purpose of carrying out standoff command guidance weapon delivery to said target.

SUMMARY OF THE INVENTION

The foregoing and other objects and advantages which will be apparent in the following detailed description of the preferred embodiment, or in the practice of the invention, are achieved by the invention disclosed herein, which generally may be characterized as a method and apparatus for forming, in conjunction with an airborne synthetic aperture radar system having an interferometer antenna and a range versus azimuth angle display, a range/doppler image having improved azimuth resolution of a ship target under the influence of sea state conditions.

In accordance with the teachings of the invention, a range/doppler image having improved azimuth resolution of a ship target under the influence of sea state conditions is formed by processing the received signals from the scatterers comprising the ship target to obtain an estimate of the net doppler producing cross line-of-sight velocity of the radar bearing aircraft relative to the ship, and determining from the estimated cross line-of-sight relative velocity the values of predetermined system parameters to be used predictively in the succeeding integration interval in forming the range/doppler image.

The formed range/doppler image having azimuth resolution is displayed in a range versus azimuth angle coordinate frame, and continuous automatic tracking of a cursor imbedded in a single designated resolution cell of the ship's displayed image, essential to carrying out precision standoff command weapon guidance to that selected ship target cell, is thereby enhanced.

In addition, techniques are provided for removing the isodop distortion inherent in the formed range/doppler image, and for centering the displayed range/doppler image of the ship target.

BRIEF DESCRIPTION OF THE DRAWINGS

Serving to illustrate an exemplary embodiment of the invention are the drawings of which.

DETAILED DESCRIPTION OF THE PREFERRED EMBODIMENT

In order to provide for a better understanding and background of the present invention, it will be useful to describe and discuss briefly the contemporary art and some of its resulting problems.

Figure 1:
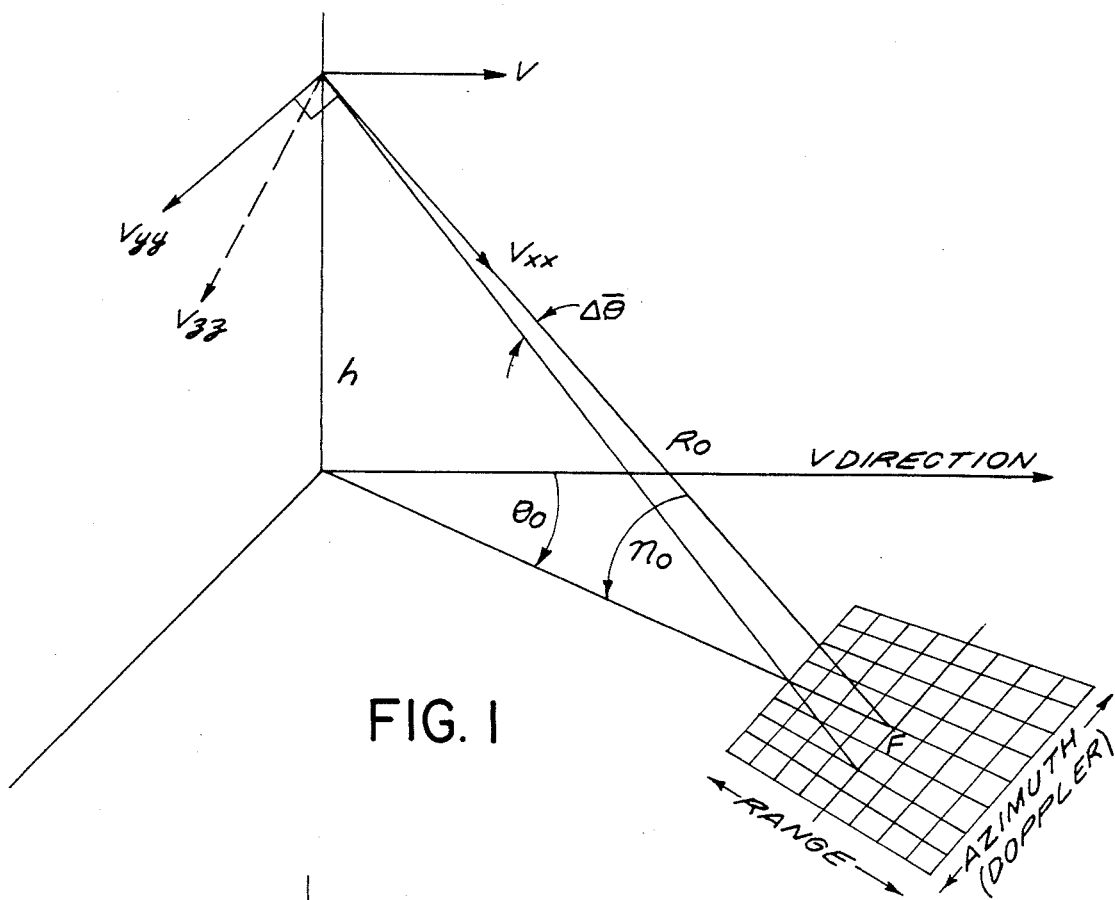
FIG. 1 illustrates aircraft and ground target geometrical relationships governing the formation of a synthetic aperture radar range/doppler image.

Referring to FIG. 1 the aircraft and ground target geometrical relationships governing the formation of a synthetic aperture radar range/doppler image are illustrated. As shown therein, for an aircraft flying with respect to a fixed ground target field, the doppler shift, $f_d$, associated with the signal reflected from a scatterer located at azimuth and elevation angle differences, $\overline{\Delta\theta}$ and $\overline{\Delta\eta}$, respectively, with respect to a boresight line drawn to focus point, F, is given by $$f_d = \frac{2}{\lambda} (V_{xx} + V_{yy}\overline{\Delta\theta} + V_{zz}\Delta\eta) \quad (1)$$

where $\lambda$ is the radiated wavelength, $V_{xx}$ is the line-of-sight velocity component, $V_{yy}$ is the cross line-of-sight velocity component, and $V_{zz}$ forms an orthogonal set with $V_{xx}$ and $V_{yy}$ as shown. Also, $\overline{\Delta\theta}$ is the azimuth angle in the slant plane containing $V_{xx}$ and $V_{yy}$ as shown. Now, from, $$\frac{h}{R_o} = \sin \eta_o$$

where, h=aircraft altitude, $R_o$ is the slant range to the ground focus point, and $\eta_o$ is the elevation angle to the focus point, after differentiation, $$\Delta\eta = -\frac{\tan \eta_o}{R_o} \Delta R \quad (2)$$

where $\Delta R$ is the slant range difference from the focus point to the scatterer in question. Substituting equation (2) into (1), yields for the doppler shift, $$f_d = \frac{2}{\lambda}\left(V_{xx} + V_{yy}\overline{\Delta\theta} - V_{zz}\frac{\tan \eta_o}{R_o}\Delta R\right) \quad (3)$$

assuming a flat target surface.

According to contemporary art, a synthetic aperture radar image can be generated by sorting the signals received in a given range resolution increment located at $\Delta R$ from the range of the focus point, F, according to their doppler frequencies, using digital signal processing techniques. This is done after the application of a suitable phase correction to all incoming signals on a pulse-to-pulse basis, to remove the effects of the line-of-sight velocity component, $V_{xx}$, on the measured doppler frequency, which, in turn, is accomplished on the basis of the system's estimate of line-of-sight velocity, $\overline{V}_{xx}$. The resulting doppler frequency is then proportional to azimuth angle from boresight, $\overline{\Delta\theta}$, (see equation (3)) plus an additive constant, $-2V_{zz}(\tan \eta_o)\Delta R/\lambda R_o$. If this constant is removed in each range bin, by adding to each sorted doppler frequency an amount, $2V_{zz}(\tan \eta_o)\Delta R/\lambda R_o$, on the basis of the system's estimate of the pertinent variables, then a realistic range/azimuth angle map results, representative of the gridded ground matrix depicted in FIG. 1. It is also seen from equation (3) that the constant of proportionality between doppler and azimuth angle is $2V_{yy}/\lambda$, so that a knowledge of aircraft cross line-of-sight velocity, $V_{yy}$, is required to establish the angular resolution associated with a prescribed doppler filter spacing.

Figure 2:
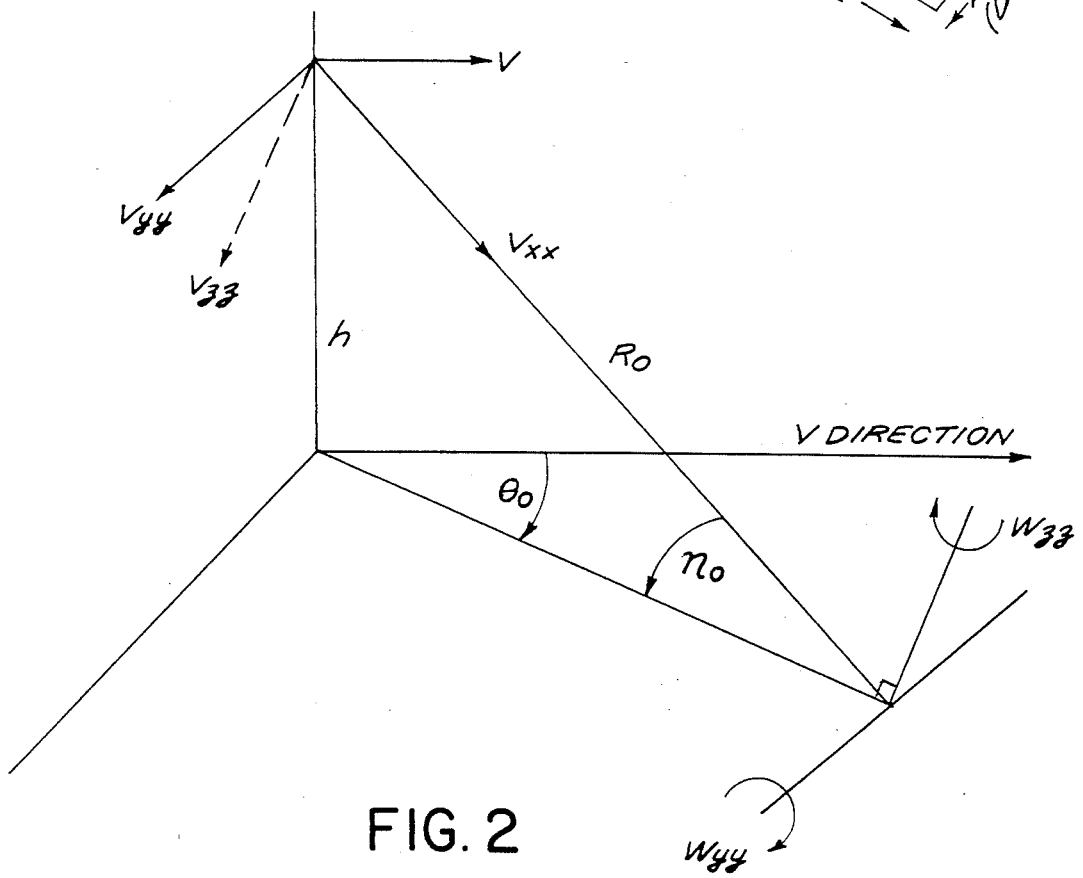
FIG. 2 illustrates aircraft and ship target geometrical and motional relationships governing the formation of a range/doppler ship image.

Referring now to FIG. 2, the aircraft and ship target geometrical and motional relationships governing the formation of a range/doppler ship image, the subject of the present invention, are illustrated. As shown therein, assuming that the ship is translating and undergoing roll, pitch, and yaw motions as a result of sea state conditions, the doppler-producing ship rotational motions can be represented by instantaneous axes of rotation, $W_{zz}$ and $W_{yy}$, both perpendicular to the line-of-sight vector from the aircraft to the center of rotation of the ship, and lying respectively in planes containing $V_{xx}$ and $V_{zz}$ and $V_{xx}$ and $V_{yy}$. It can be readily shown that the additional doppler shifts of the signals observed at the radar resulting from $W_{zz}$ and $W_{yy}$ rotations, for ship scatterers assumed to lie in the horizontal datum plane of FIG. 2, are given respectively by $2W_{zz}\overline{\Delta\theta}R_o/\lambda$ and $-2W_{yy}(\tan \eta_o)\Delta R/\lambda$. Accordingly, the doppler shift expression, including both aircraft and ship motions, by analogy to equation (3), is given by, $$f_d = \frac{2}{\lambda}\left(V'_{xx} + V'_{yy}\overline{\Delta\theta} - V'_{zz}\frac{\tan \eta_o}{R_o}\Delta R\right) \quad (4)$$

where the following definitions are employed, $$V'_{xx} \equiv V_{xx} \quad (5)$$

$$V'_{yy} \equiv V_{yy} + W_{zz}R_o \quad (6)$$

$$V'_{zz} \equiv V_{zz} + W_{yy}R_o \qquad (7)$$

and where $V_{xx}$, $V_{yy}$ and $V_{zz}$ are now the relative translational velocities between aircraft and ship, given by, $$V_{xx} = (V_{xx})_{A/C} - (V_{xx})_{SHIP} \qquad (8)$$
$$V_{yy} = (V_{yy})_{A/C} - (V_{yy})_{SHIP} \qquad (9)$$
$$V_{zz} = (V_{zz})_{A/C} - (V_{zz})_{SHIP} \qquad (10)$$

As a prerequisite to doppler processing the date for the formation of a range/doppler image with contemporary art, the system estimate, $\widetilde{V}'_{xx}$ of the true line-of-sight velocity, $V'_{xx}$ is used to motion compensate the data for focusing and image centering to correct for both aircraft and ship translational motions. Defining, $$\widetilde{V}_{xx} = V'_{xx} + \epsilon_{v'xx} \qquad (11)$$

where $\epsilon_{v'xx}$ is the error in line-of-sight velocity estimate, equation (4) becomes, $$f_d = \frac{2}{\lambda}\left(-\epsilon_{v'xx} + V'_{yy}\overline{\Delta\theta} - V'_{zz}\frac{\tan\eta_o}{R_o}\Delta R\right). \qquad (12)$$

Without further corrections, a doppler processed ship image would lack display centering in proportion to the error in line-of-sight velocity, $\epsilon_{v'xx}$. Since ship velocity is normally unknown, this error source could ordinarily be of considerable magnitude. Furthermore, since for moderate to severe sea state conditions, (see equations (6) and (7))

$$|W_{zz}R_o| >> |V_{yy}|$$

and, $$|W_{yy}R_o| >> |V_{zz}|,$$

the doppler-producing cross line-of-sight velocities, $V'_{yy}$ and $V'_{zz}$ in equation (12) are largely determined by ship angular rotation rates, $W_{zz}$ and $W_{yy}$, which too, are unknown. Since azimuth resolutin for fixed filter bandwidth depends on $V'_{yy}$, large uncertainty in this value precludes the achievement of desired image azimuth resolution, which could thereby preclude image recognition. Scaling of the horizontal (azimuth) dimension of the resulting image is also correspondingly unknown. Uncertainty in $V'_{zz}$ prevents the proper removal of the image distortion (commonly referred to as "isodop" distortion) as a function of the range extent of the image, which could be very severe for the normally large values of $V'_{zz}$ encountered in a high sea.

Figure 3A:
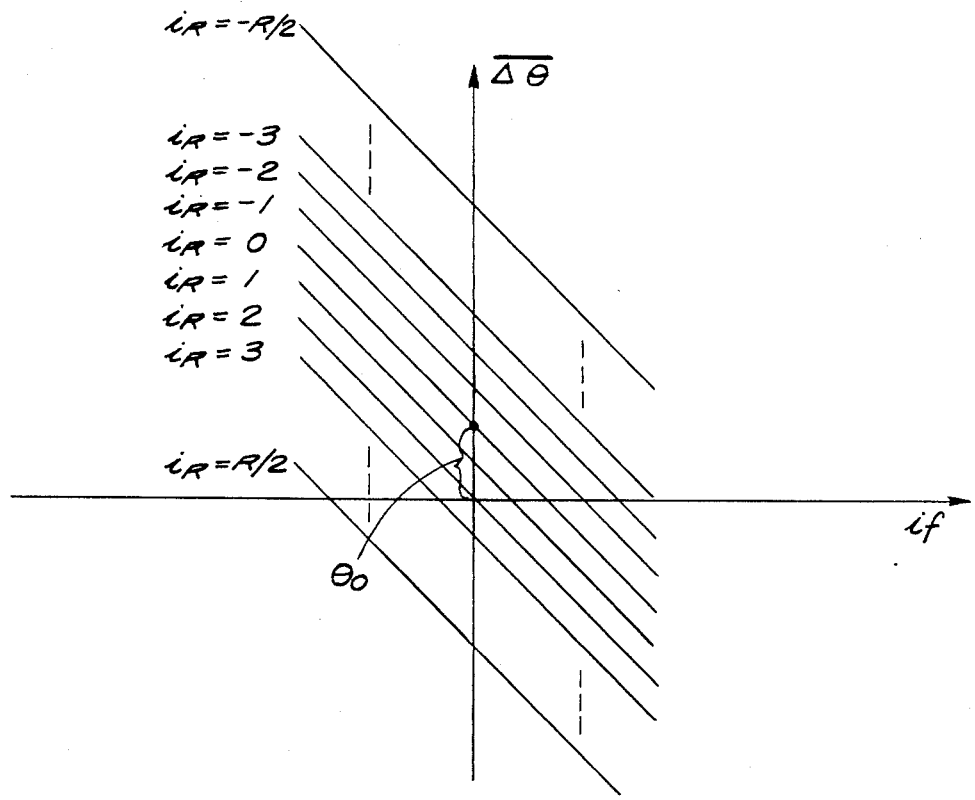
FIG. 3A depicts doppler versus azimuth angle functional relationships for assumed ship rotational rates of $-W_{zz}$ and $+W_{yy}$.
Figure 3B:
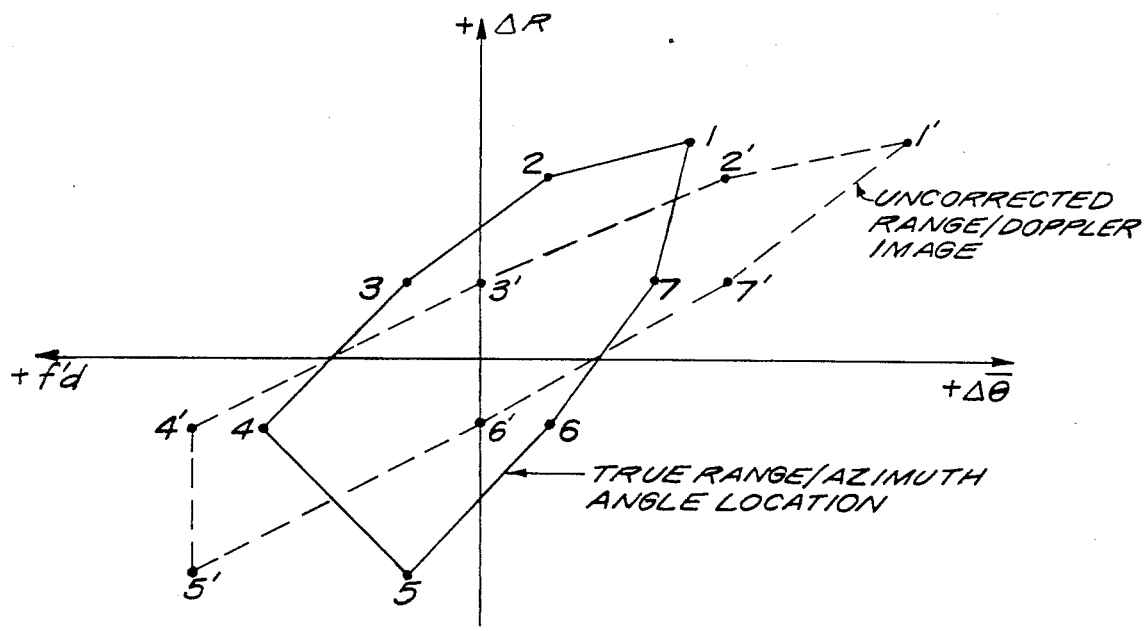
FIG. 3B illustrates a range/doppler image for the assumed rotational rates as represented in FIG. 3A.
Figure 4A:
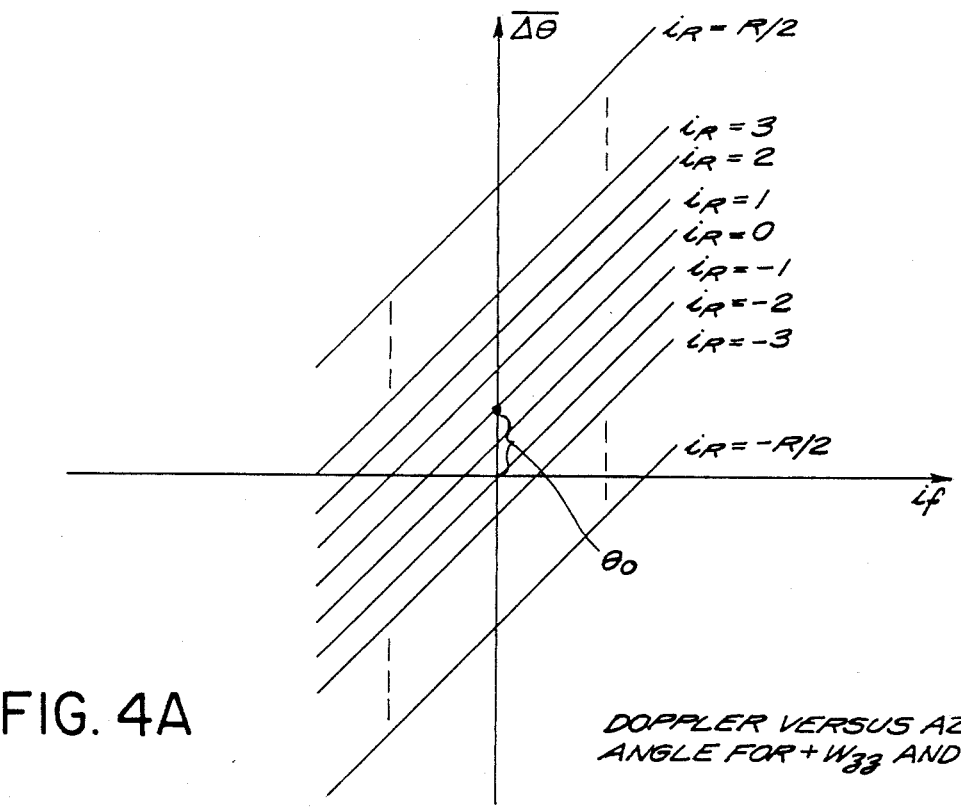
FIG. 4A depicts doppler versus azimuth angle functional relationships for assumed ship rotational rates of $+W_{zz}$ and $+W_{yy}$.
Figure 4B:
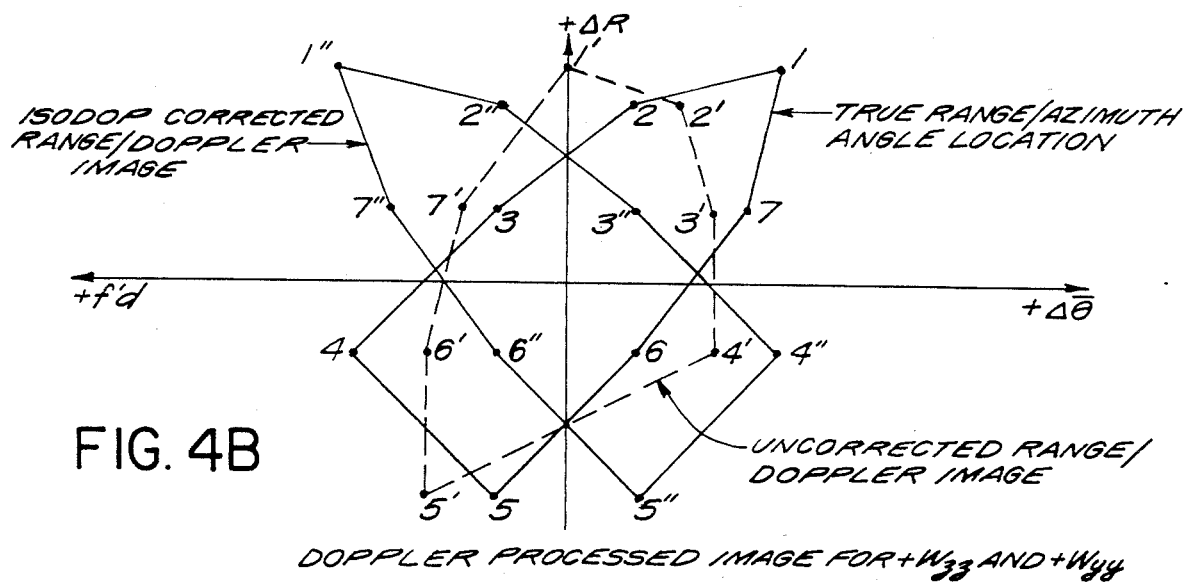
FIG. 4B illustrates a range/doppler image for the assumed rotational rates as represented in FIG. 4A.

FIG. 3B illustrates the "isodop" distortion inherent in a range/doppler image (shown dashed) associated with an actual range/azimuth angle representation (shown solid) for assumed ship rotational rates of $-W_{zz}$ and $+W_{yy}$. FIG. 3A depicts a functional plot of equation (12) for this condition (assuming $\epsilon_{v'xx}=0$) and is the basis for the range/doppler image of FIG. 3B. (The negative $\overline{\Delta\theta}$ axis is taken to correspond to positive doppler which would be the case as depicted by FIG. 1, assuming aircraft motion only.) Similarly, FIGS. 4A and 4B illustrate the same for $+W_{zz}$ and $+W_{yy}$. It is to be noted that in addition to the isodop distortion exhibited by FIG. 4B, the image has also been inverted along the azimuth dimension due to the change in sign of the doppler gradient with respect to azimuth angle.

The objectives and goals of the present invention are achieved with a novel processing approach, wherein the velocity quantities, $\epsilon_{v'xx}$, $V'_{yy}$, and $V'_{zz}$, and hence the ship translational and rotational rates, are determined from the body of data available to the SAR/Interferometer System.

A doppler cell index, $i_f$, is defined, where $$i_f = \frac{f_d}{\Delta f_d} \qquad (13)$$

where $\Delta f_d$ is the doppler filter bandwidth established in the digital signal processing. Also, doppler filter bandwidth relates to the synthetic aperture integration time, T, by $$\Delta f_d = 1/T \text{ tm (14)}$$

where
ti $N_P = Tf_r$, (15)

$N_P$ is the number of pulses integrated during the synthetic aperture and $f_r$ is the pulse repetition frequency. Furthermore, a range cell index, $i_R$, is defined, wherein, $$i_R = \frac{\Delta R}{RR} \qquad (16)$$

in which RR=desired range resolution. Combining equations (13) through (16) with (12), and rearranging, results in, $$\overline{\Delta\theta} = \left(\frac{\epsilon_{v'xx}}{V'_{yy}}\right) + \left(\frac{\lambda}{2}\right)\left(\frac{f_r}{N_p}\right)\frac{i_f}{V'_{yy}} + \frac{\tan\eta_o}{R_o}(RR)\left(\frac{V'_{zz}}{V'_{yy}}\right)i_R, \qquad (17)$$

which expresses azimuth angle in terms of doppler and range cell indices. Equation (17) is seen to be of the form, $\overline{\Delta\theta} = \theta_o + K_f i_f + K_R i_R$, and represents a family of straight lines, similar in form to FIGS. 3A and 4A.

By plotting measured interferometric azimuth angle, $\overline{\Delta\theta}$, for all range and doppler cell indices, $i_R$ and $i_f$, including ship returns, and using standard least squares linear regression techinques to fit straight lines to each range bin of data, a set of quantities are obtained from the resulting data, defined as follows:

$\theta_o \equiv$ the averaged (over all range bins) azimuth angle intercept, corresponding to $i_R=0$ at $i_f=0$ $K_f \equiv$ the averaged (over all range bins) rate of change of $\Delta\theta$ with respect to $i_f$ for constant $i_R$ $K_r \equiv$ the averaged (over all range bins) rate of change of $\overline{\Delta\theta}$ with respect to $i_R$ for constant $i_f$.

By analogy to equation (17), therefore, the following equalities are written:

$$\theta_o = \left( \frac{\epsilon_{v'xx}}{V'_{yy}} \right) \tag{18}$$

$$K_f = \left( \frac{\lambda f_r}{2 N_p V'_{yy}} \right) \tag{19}$$

and, $$K_R = \left( \frac{\tan \eta_o}{R_o} \right) (RR) \left( \frac{V'_{zz}}{V'_{yy}} \right) \tag{20}$$

and,
from which, the three velocity terms, $\tilde{\epsilon}_{v'xx}$, $\tilde{V}'_{yy}$ and $\tilde{V}'_{zz}$ are derived:

$$\tilde{\epsilon}_{v'xx} = \theta_o \left( \frac{\lambda f_r}{2 N_p K_f} \right) \tag{21}$$

$$\tilde{V}'_{yy} = \left( \frac{\lambda f_r}{2 N_p K_f} \right) \tag{22}$$

$$\tilde{V}'_{zz} = \left( \frac{\lambda R_o f_r K_R}{2 N_p \tan \eta_o (RR) K_f} \right). \tag{23}$$

The regression constants, $K_f$, $K_R$, and $\theta_o$ are determined as follows:

The slope of the straight line fit $(K_f)$ to doppler versus azimuth angle measurement data in the range bin denoted by $i_R$ is found from standard least squares linear regression formulae, $$(K_f)_{iR} = \frac{\Sigma(w_{if})\Sigma(w_{if})(i_f)(\overline{\Delta\theta})_{if} - \Sigma(w_{if})(i_f)\Sigma(w_{if})(\overline{\Delta\theta})_{if}}{\Sigma(w_{if})\Sigma(w_{if})(i_f)^2 - [\Sigma(w_{if})(i_f)]^2} \tag{24}$$

where $i_f$ and $(\Delta\theta)_{if}$ are doppler cell index and interferometric azimuth angle, respectively, of that cell, and $w_{if}$ is a relative weight proportional to doppler cell signal power. The summations are carried out over all doppler filters processed in each range bin, $i_R$. An improved slope estimate, $K_f$, for use in equations (21) through (23), is obtained by averaging over all range bins (R+1), $$K_f = \frac{(K_f)_{iR}}{R+1} \tag{25}$$

Similarly, in each range bin, the azimuth angle intercept, $(\overline{\Delta\theta})_{iR}$ for $i_f=0$, is found from, $$[(\overline{\Delta\theta})_{iR}]_{if=0} = \frac{\Sigma(w_{if})(i_f)^2\Sigma(w_{if})(\overline{\Delta\theta})_{if} - \Sigma(w_{if})(i_f)\Sigma(w_{if})(i_f)(\overline{\Delta\theta})_{if}}{\Sigma(w_{if})\Sigma(w_{if})(i_f)^2 - [\Sigma(w_{if})(i_f)]^2} \tag{26}$$

Figure 5:
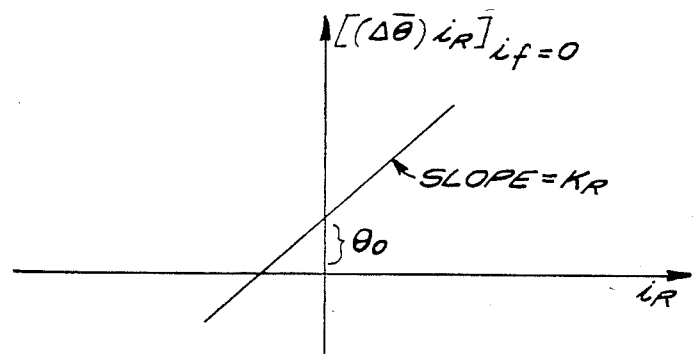
FIG. 5 illustrates the determination of $K_R$ and $\theta_o$ via a linear regression curve fit.

As illustrated in FIG. 5, the values of $\theta_o$ and $K_R$ for use in solving for the velocity terms $\tilde{\epsilon}_{v'xx}$, $\tilde{V}'_{yy}$, and $\tilde{V}'_{zz}$ in equations (21) through (23), are found by plotting $[(\overline{\Delta\theta})_{iR}]_{if=0}$ versus $i_R$ and determining slope and intercept values, using similar regression equations. Accordingly, $$K_R = \frac{(R+1)\Sigma(i_R)[(\overline{\Delta\theta})_{iR}]_{if=0} - \Sigma(i_R)\Sigma[(\overline{\Delta\theta})_{iR}]_{if=0}}{(R+1)\Sigma(i_R)^2 - [\Sigma(i_R)]^2} \tag{27}$$

and, $$\theta_o = \frac{\Sigma(i_R)^2\Sigma[(\overline{\Delta\theta})_{iR}]_{if=0} - \Sigma(i_R)\Sigma(i_R)[(\overline{\Delta\theta})_{iR}]_{if=0}}{(R+1)\Sigma(i_R)^2 - [\Sigma(i_R)]^2} \tag{28}$$

In terms of the invention, the determined error in system line-of-sight velocity, $\tilde{\epsilon}_{v'xx}$ permits a continual (aperture to aperture) update of the system $V'_{xx}$ estimate, thereby eliminating image azimuth centering errors by providing for an exact motion compensation correction for aircraft to ship net line-of-sight velocity. Furthermore, referring to equation (12), by adding to the doppler frequency, $f_d$ of every resolution cell of each range bin, $i_R$ an amount, $$\frac{2}{\lambda} \frac{\tan \eta_o}{R_o} (RR) \tilde{V}_{zz} i_R, \text{ for } i_R = 0, \pm 1, \pm 2, \text{ etc.}$$

or equivalently, $$\frac{2}{\lambda} \frac{\tan \eta_o}{R_o} (RR) \tilde{V}_{zz} i_R X (T) \text{ doppler cell indices,}$$

rounded to the nearest unit, the isodop distortion inherent in the image is removed, so that the resulting range/doppler matrix truly represents the range/azimuth angle image of the ship. In this manner, the dashed image of FIG. 3B is restored to its true range/angle counterpart; the dashed image of FIG. 4B is transposed, after isodop correction, to the solid image shown. The processor recognizes, however, that the sign of $W_{zz}$ is such as to have caused mirror imaging of the doppler image about the range axis, so that the isodop corrected image is accordingly reversed to agree with the true range/azimuth distribution of the ship target.

From equation (12) and the knowledge of $V'_{yy}$ determined from equation (22), the doppler filter bandwidth and filter frequency spacing, $\Delta f_d$, is given by, $$\Delta f_d = \frac{2}{\lambda} \tilde{V}_{yy} (\overline{\Delta\theta})_{res}. \tag{29}$$

for prescribed azimuth resolution $(\Delta\theta)_{res}$: Recognizing that linear azimuth resolution, $d_{az}$, is $$d_{az} = R_o(\overline{\Delta\theta})_{res}, \tag{30}$$

then from equations (29), (30), and (22), $$\Delta f_d = \left( \frac{2 d_{az}}{\lambda R_o} \right) \tilde{V}_{yy} \tag{31}$$

and correspondingly, the synthetic aperture integration time, T, is given by $T=1/\Delta f_d$. Also, the pulse repetition frequency, $f_r$, for specified array length, $N_p$, and azimuth resolution, $d_{az}$, is given by, $$f_r = \frac{N_p}{T} = \left(\frac{2 N_p d_{az}}{\lambda R_o}\right) \tilde{V}'_{yy} \qquad (32)$$

Filter bandwidth, integration time, and pulse repetition frequency are used predictively for the next aperture, in terms of the present estimated value $\tilde{V}'_{yy}$. Furthermore, range performance can be extended appreciably by smoothing the derived velocity constants over many apertures using standard curve fitting or filtering techniques.

Ship translational motion must be tracked so that antenna boresignt and range swath start bear a constant relationship with respect to the ship. Interferometric azimuth angle data from each useful ship resolution cell are averaged on an array-to-array basis for antenna azimuth control. The updated line-of-sight velocity obtained from the regression solution is tracked so as to advance or retard the range swath start trigger in accordance with ship as well as aircraft motion. Range rate and azimuth rate so determined are applied to the system computer so as to also steer antenna boresight in both azimuth and elevation in accordance with both ship and aircraft translational motions.

Significant returns from ship scatterers at different elevation angles, such as from the mast of a ship, could produce data points which fall considerably off the straight line plot of azimuth angle versus doppler frequency due to their different velocities from those at similar azimuth angles but at a lower datum plane, thereby perturbing slope and intercept values used in the regression algorithms. Any such points can be eliminated by excluding any data points outside of a prescribed threshold band about the least squares fit formed from all available data points, and refitting the data after such exclusion. Should elevation angle measurement also be implemented in addition to azimuth, then elevation measurements can also be used as an added discriminant in the exclusion process.

For purposes of weapon guidance, a cursor is moved about the displayed image and placed over a particular range/doppler resolution cell, the designated target cell. The appropriate values of range and interferometrcially determined azimuth angle can be extracted from the system for relative range/azimuth angle weapon guidance of a weapon borne transponder to the designated target cell. This is done by recognizing from equation (17), that after isodop correction, the smoothed azimuth angle of any designated range/doppler cell of indices $i_R$ and $i_f$, can be expressed by, $$\overline{\Delta\theta} = \theta_o + K_f(i_f) \qquad (33)$$

where $i_f$ is the doppler cell index of the cursor designated filter containing the isodop corrected target signal. The techniques embodied in this invention are seen to provide, in addition, a substantially improved azimuth angle accuracy of a designated target cell than would ordinarily be achieved on the basis of an inteferometric measurement to that cell alone, since the azimuth angle estimate denoted by equation (17), after isodop correction, $\overline{\Delta\theta} = \theta_o + K_f i_f$, derives benefit from all the azimuth angle measurement entering into the regression estimates.

As time progresses, cursor tracking of a designated target cell is accomplished in terms of its predicted range/azimuth location (suitably referred to the range/-doppler coordinates of the display via available interferometric data) relative to the SAR bearing aircraft on the basis of the derived relative translation between aircraft and ship from aperture to aperture.

If cursoring is done to a resolution cell near the extremity of the ship, however, then cursor misalignment to that cell from frame to frame of from 1 to 2 resolution cell lengths could normally result principally due to ship yaw motions. This cursoring track error can be recovered, however, because of the fact that $W_{zz}$, the essential contributor to such tracking error, is computable from equation (6), where $V'_{yy}$ is computed by equation (22) and $V_{yy}$, the aircraft to ship relative cross line-of-signt velocity, is obtained from airborne inertial measurements and ship translational velocity estimates. From a knowledge of $W_{zz}$, range and azimuth cursor track corrections, d ($\Delta R$) and d (az), are shown in the aforementioned application of Boles, entitled "Range/Azimuth Ship Imaging For Ordnance Control", to be $$d(\Delta R) = -i_f(d_{az}) \int W_{zz} dt$$

and $$d(az) = i_R(RR) \int W_{zz} dt$$

where $i_f$ and $i_R$ are initial cursor doppler and range cell indices, $W_{zz}$ dt is the rotated angle about the zz axis, and where the integration is performed on a frame-to-frame basis from the time of initial cursor placement.

Figure 6:
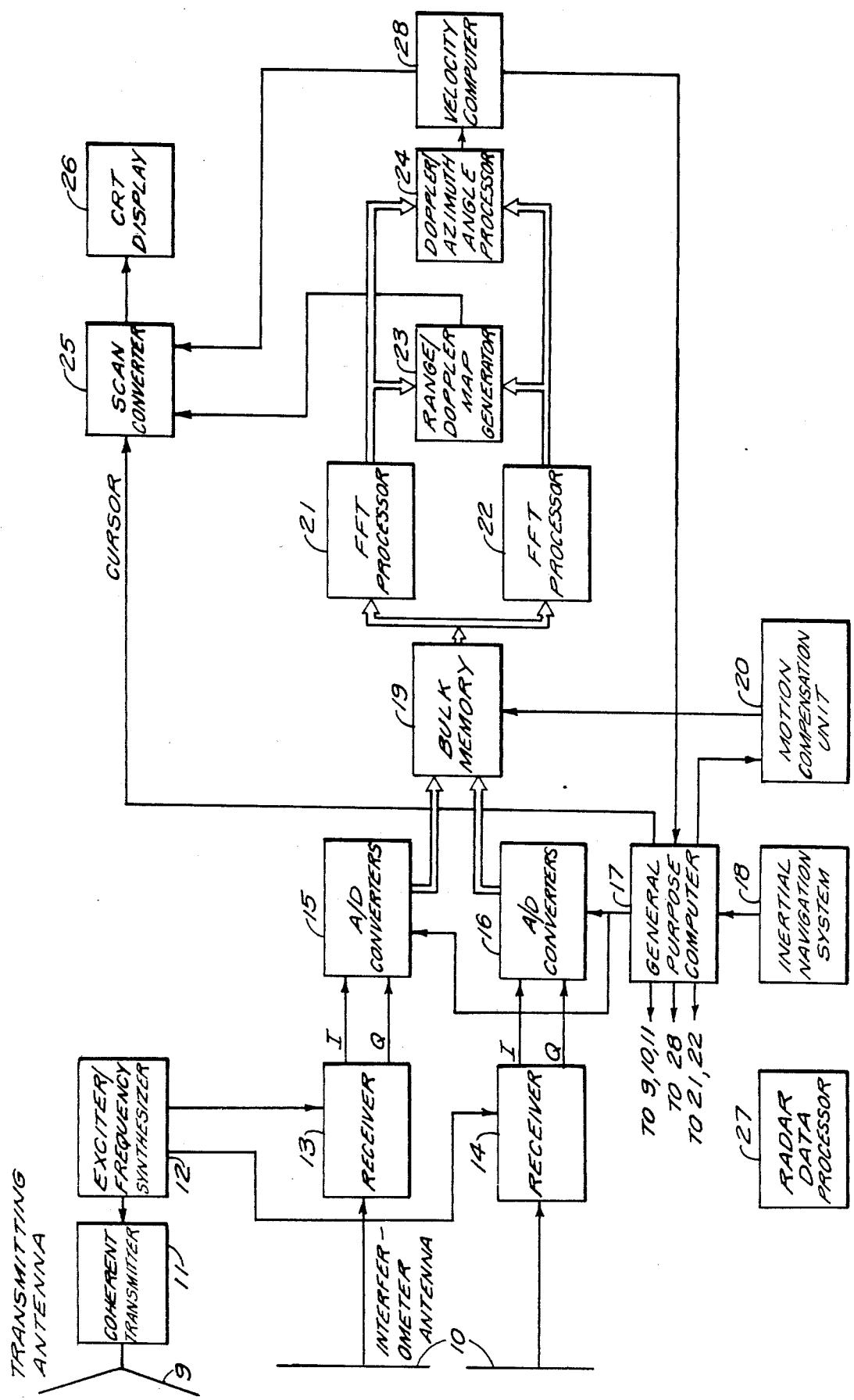
FIG. 6 is a block diagram illustrating the physical embodiments of the present invention.

Referring now to FIG. 6, a block diagram of the preferred embodiment of the system used for practicing the present invention is illustrated. As shown therein, pulses of electro-magnetic energy generated in Coherent Transmitter 11 from reference signals derived in Exciter/Frequency Synthesizer 12 are radiated from Transmitting Antenna 9 so as to optimally illuminate a ship target under way on the surface of the sea. Signals reflected from the ship target are received by Interferometer Antenna 10 comprised of two separate receiving elements whose common boresight direction corresponds to that of Transmitting Antenna 9. Reference signals from Exciter/Frequency Synthesizer 12, coherent with the transmitted signal, are applied to Receivers 13 and 14 to demodulate the target signals received by the interferometer elements to quadrature related I and Q doppler shifted components, which represent the real and imaginary components of the instantaneous analog signal vectors out of the receivers. These analog signal components are digitized in the A/D Converters 15 and 16 at a sampling rate determined by system range resolution requirements. These digitized samples, representing separately the signals received by the two interferometer elements, are stored in Bulk Memory 19 on a pulse-to-pulse basis. Concurrently, motion compensation corrections for antenna phase center translational and rotational motions, as well as for ship translational motion, are computed and stored in Motion Compensation Unit 20 in a time sequenced order on the basis of computations performed in General Purpose Computer 17 of the two-way line-of-sight displacement change between antenna phase centers and the tracking point of the ship, predicated on the regression solution for line-of-sight velocity obtained from Velocity Computer 28 and from Inertial Navigation System 18 measurements.

At the end of the coherent integration interval for which data is being collected, corrections stored in Motion Compensation Unit 20 are applied to the time sequences stored in Bulk Memory 19 in the form of vector rotations reflecting the two-way motion compensation phase correction to each range sample of each pulse of the (2) sequences representing signals received at the two interferometer halves over the coherent integration interval. After motion compensation correction, data is read out of Bulk Memory 19 (as new data is being entered) for Fourier Transform digital signal processing to produce the necessary filtering so as to provide the desired azimuth resolution in each range bin. The filtering is performed in FFT Processors 21 and 22 which perform Fast Fourier Transform digital processing so as to produce azimuth resolved coherently integrated vector sums in each doppler filter of each range bin. The outputs of FFT Processors 21 and 22 are applied to Range/Doppler Map Generator 23 for noncoherent integration on a cell-by-cell basis and hence, to Scan Converter 25 for isodop distortion removal, for summation with cursor video signals generated in Scan Converter 25, and for image intensity scaling, prior to inputting to CRT Display 26 for image presentation of the ship target.

The range/doppler maps generated in FFT Processors 21 and 22 are also inputted to Doppler/Azimuth Angle Processor 24 where a phase comparison is made between corresponding range/doppler cell outputs in the two maps on a cell-by-cell basis, for each and every resolution cell of the two maps, to yield the interferometric azimuth angle of the signal received in each such resolution cell, in accordance with well known interferometric principles, i.e., $\overline{\Delta\theta} = \sin^{-1}[(\lambda/2\pi d)\phi]$, where $\Delta\theta$ is the azimuth spatial angle, d is the interferometer baseline spacing, and $\phi$ is the measured electrical phase. The doppler/azimuth angle data distributions in each range bin that are formed in Doppler/Azimuth Angle Processor 24 are applied to Velocity Computer 28 wherein the constants $K_f$, $K_R$, and $\theta_o$, are determined using linear regression techniques in accordance with the teachings of this invention and as exemplified by equations (24) through (28), from which the three velocity terms, $\widetilde{\epsilon}_{v'xx}$, $\widetilde{V}'_{yy}$, and $\widetilde{V}'_{zz}$ are computed as specified by equations (21) through (23). In these latter three equations, $\lambda$, $f_r$, $N_p$, $R_o$, and RR are operating constants, and $\eta_o$, the depression angle to the ship focus point, is derived from on-board altitude and slant range measurements, all of which are obtained from General Purpose Computer 17.

The value of $\widetilde{V}'_{zz}$ so determined in Velocity Computer 28 is used to remove the isodop distortion inherent in the range/doppler image stored in Scan Converter 25, by shifting each doppler cell index of each range bin, $i_R$, equally by an amount $$\left(\frac{2}{\lambda}\right)\left(\frac{\tan \eta_o}{R_o}\right)(RR)\widetilde{V}_{zz}i_R(T),$$

rounded to the nearest doppler cell unit. The resulting range/doppler image in Scan Converter 25, which now represents the true range/azimuth distribution of the ship image, is inputted to CRT Display 26. Concurrently, the 3 velocity terms derived from the regression solutions in Velocity Computer 28, $\widetilde{\epsilon}_{v'xx}$, $\widetilde{V}'_{yy}$ and $\widetilde{V}'_{zz}$ are inputted to General Purpose Computer 17.

The value of line-of-sight velocity error, $\widetilde{\epsilon}_{v'xx}$ is used as a line-of-sight velocity correction, $-\epsilon_{v'xx}$, in Motion Compensation Unit 20 for the purpose of focusing and image centering by the application of Motion Compensation phase corrections as described earlier.

The value of $\widetilde{V}'_{yy}$ is used by General Purpose Computer 17 for the formation of doppler filter bandwidth and spacing, integration time, and pulse repetition frequency, as prescribed by equations (31) and (32), to be used in the formation of the next synthetic aperture.

Antenna azimuth steering commands are generated in General Purpose Computer 17 on the basis of aircraft navigational data inputs from the Inertial Navigation System 18 and averaged interferometric azimuth angle measurements from the various ship scatterers provided by Doppler/Azimuth Angle Processor 24, in such a manner as to maintain the average of all interferometric azimuth angles at zero (with respect to its electrical boresight) when smoothed with a tracking filter in General Purpose Computer 17 over successive apertures. The net pulse-to-pulse two-way line-of-sight displacement change due to relative translational motion between aircraft and ship computed in General Purpose Computer 17 for purposes of motion compensation, also serves as a basis for controlling the precise timing for the start of range sampling at A/D Converters 15 and 16, so that corresponding samples from pulse-to-pulse over the coherent integration interval represent the same range increment of the ship. The net line-of-sight displacement change with time, in conjunction with aircraft altitude available in General Purpose Computer 17 from other on-board sensors, is used to provide elevation steering to the Transmitting antenna 9 and receiving Interferometer Antenna 10.

Cursor placement to a desired resolution cell of the ship image is achieved by operator designation of video signals through General Purpose Computer 17 and applied to Scan Converter 25. Cursor tracking of the designated ship target resolution cell during the weapon delivery phase is similarly controlled by General Purpose Computer 17 on the basis of its computations of target cell range and azimuth angle change with time derived from its navigational solutions for translational motions between aircraft and ship, wherein said cursor video signals are injected into appropriate range/doppler resolution cells as time progresses. Second order corrections to cursor tracking of the designated ship target cell to eliminate potential tracking errors arising from ship rotational (yaw) motion are effected as described in the aforementioned application of Boles, entitled "Range/Azimuth Ship Imaging For Ordnance Control".

Control signals for the pointing of Antennae 9 and 10 and for pulse repetition frequency (prf) control of coherent Transmitter 11 are obtained from General Purpose Computer 17. All task management such as data transmission and initiation of subroutine sequences, are performed by the Radar Data Processor 27.

Although separate transmitting and receiving antennae have been illustrated in the block diagram if FIG. 6, both transmitting and receiving functions could be combined into a single aperture. All elements in the block diagram can be either manufactured or purchased as separate commercial entities and incorporated into the embodiments of this invention by those skilled in the art. Also, many of the functional units shown separately in FIG. 6 can be combined for purposes of design economy.

Thus, although the invention has been described and illustrated in detail, it is to be understood that the same is exemplary and is not to be taken by way of limitation, the spirit and scope of this invention being limited only by the terms of the appended claims.

What is claimed is:

1. In conjunction with an airborne synthetic aperture radar system having an interferometer antenna and a range versus azimuth display, a method for forming a range/doppler image having improved azimuth resolution of a ship target under the influence of sea state conditions comprising the steps of:
   (a) processing the received signals from the scatterers comprising the ship target to obtain an estimate of the net doppler producing cross line-of-sight velocity of the radar bearing aircraft relative to the ship;
   (b) determining from the estimated cross line-of-sight relative velocity the values of predetermined system parameters to be used predictively in the succeeding integration interval in forming the range/doppler image;
   (c) displaying in a range versus azimuth coordinate frame the formed range/doppler image of the ship target; and
   (d) removing the isodop distortion in the formed range/doppler image and centering the displayed range/doppler image of the ship target.

2. In conjunction with an airbone synthetic aperture radar system having an interferometer antenna and a range versus azimuth display, a method for forming a range/doppler image having improved azimuth resolution of a ship target under the influence of sea state conditions comprising the steps of:
   (a) processing the received signals from the scatterers comprising the ship target to obtain an estimate of the net doppler producing cross line-of-sight velocity of the radar bearing aircraft relative to the ship;
   (b) determining from the estimated cross line-of-sight relative velocity the values of predetermined system parameters to be used predictively in the succeeding integration interval in forming the range/doppler image;
   (c) displaying in a range versus azimuth coordinate frame the formed range/doppler image of the ship target;
   (d) removing the isodop distortion in the formed range/doppler image and centering the displayed range/doppler image of the ship target; and
   (e) cursoring a designated range/doppler resolution cell of the displayed image of the ship target; and tracking from aperture to aperture the range and interferometrically determined azimuth of the designated resolution target cell.

3. In conjunction with an airborne synthetic aperture radar system having an interferometer antenna and a range versus azimuth display, a method for forming a range/doppler image having improved azimuth resolution of a ship target under the influence of sea state conditions comprising the steps of:
   (a) processing the received signals from the scatterers comprising the ship target to obtain an estimate of the net doppler producing cross line-of-sight velocity of the radar bearing aircraft relative to the ship;
   (b) determining from the estimated cross line-of-sight relative velocity the values of predetermined system parameters to be used predictively in the succeeding integration interval in forming the range/doppler image;
   (c) displaying in a range versus azimuth coordinate frame the formed range/doppler image of the ship target;
   (d) removing the isodop distortion in the formed range/doppler image and centering the displayed range/doppler image of the ship target;
   (e) cursoring a designated range/doppler resolution cell of the displayed image of the ship target; and tracking from aperture to aperture the range and interferometrically determined azimuth of the designated resolution target cell; and
   (f) steering the pointing of the interferometer antenna boresight to provide radar illumination of the ship target.

4. In conjunction with an airborne synthetic aperture radar system having an interferometer antenna and a range versus azimuth display, a method for forming a range/doppler image having improved azimuth resolution of a ship target under the influence of sea state conditions comprising the steps of:
   (a) processing the received signals from the scatterers comprising the ship target to obtain an estimate of the net doppler producing cross line-of-sight velocity of the radar bearing aircraft relative to the ship;
   (b) determining from the estimated cross line-of-sight relative velocity the values of predetermined system parameters to be used predictively in the succeeding integration interval in forming the range/doppler image;
   (c) displaying in a range versus azimuth coordinate frame the formed range/doppler image of the ship target;
   (d) removing the isodop distortion in the formed range/doppler image and centering the displayed range/doppler image of the ship target;
   (e) cursoring a designated range/doppler resolution cell of the displayed image of the ship target; and tracking from aperture to aperture the range and interferometrically determined azimuth of the designated resolution target cell;
   (f) steering the pointing of the interferometer antenna boresight to provide radar illumination of the ship target; and
   (g) controlling the range sampling timing so that corresponding range samples from pulse-to-pulse over the integration interval corresponded to the same range increment of the ship target.

5. In conjunction with an airborne synthetic aperture radar system having an interferometer antenna and a range versus azimuth display, a method of forming a range/doppler image having improved azimuth resolution of a ship target under the influence of sea state conditions comprising the steps of:
   (a) processing the received signals from the scatterers comprising the ship target to obtain an estimate of the net doppler producing cross line-of-sight velocity of the radar bearing aircraft relative to the ship;
   (b) determining from the estimated cross line-of-sight relative velocity the values of predetermined system parameters to be used predictively in the succeeding integration interval in forming the range/doppler image;
   (c) displaying in a range versus azimuth coordinate frame the formed range/doppler image of the ship target;
   (d) removing the isodop distortion in the formed range/doppler image and centering the displayed range/doppler image of the ship target;

(e) cursoring a designated range/doppler resolution cell of the displayed image of the ship target; and tracking from aperture to aperture the range and interferometrically determined azimuth of the designated resolution target cell;

(f) steering the pointing of the interferometer antenna boresight to provide radar illumination of the ship target;

(g) controlling the range sampling timing so that corresponding range samples from pulse-to-pulse over the integration interval corresponded to the same range increment of the ship target; and (h) applying to the cursor location on an aperture to aperture basis a tracking correction to compensate for the rotation of the ship about the axis orthogonal to both the relative cross line-of-sight velocity and the radar line-of-sight to the center of rotation tracking point of the ship target.

6. In conjunction with an airborne synthetic aperture radar system having an interferometer antenna and a range versus azimuth display, a method of forming a range/doppler image having improved azimuth resolution of a ship target under the influence of sea state conditions comprising the steps of:

(a) processing the received signals from the scatterers comprising the ship target to obtain an estimate of the net doppler producing cross line-of-sight velocity of the radar bearing aircraft relative to the ship;

(b) determining from the estimated cross line-of-sight relative velocity the values of predetermined system parameters to be used predictively in the succeeding integration interval in forming the range/doppler image;

(c) displaying in a range versus azimuth coordinate frame the formed range/doppler image of the ship target;

(d) removing the isodop distortion in the formed range/doppler image and centering the displayed range/doppler image of the ship target;

(e) cursoring a designated range/doppler resolution cell of the displayed image of the ship target; and tracking from aperture to aperture the range and interferometrically determined azimuth of the designated resolution target cell;

(f) steering the pointing of the interferometer antenna boresight to provide radar illumination of the ship target;

(g) controlling the range sampling time so that corresponding range samples from pulse-to-pulse over the integration interval correspond to the same range increment of the ship target;

(h) applying to the cursor location on an aperture to aperture basis a tracking correction to compensate for the rotation of the ship about the axis orthogonal to both the relative cross line-of-sight velocity and the radar line-of-sight to the center of rotation tracking point of the ship target; and (i) including processing the received signals by:
  (1) measuring interferometrically the azimuth angle of the received signal in each doppler filter in each range bin;
  (2) plotting measured interferometric azimuth angle as a function of a predefined doppler cell index and a predefined range cell index for all range and doppler cell indices;
  (3) fitting straight lines to the plotted doppler/azimuth angle distributions for each of the range bins; and
  (4) obtaining from predefined characteristics derived from the family of fitted straight lines an estimate of the net doppler producing cross line-of-sight velocity of the radar bearing aircraft relative to the ship.

7. In conjunction with an airborne synthetic aperture radar system having an interferometer antenna and a range versus azimuth display, a method for forming a range/doppler image having improved azimuth resolution of a ship target under the influence of sea state conditions comprising the steps of:

(a) processing the received signals from the scatterers comprising the ship target to obtain an estimate of the net doppler producing cross line-of-sight velocity of the radar bearing aircraft relative to the ship;

(b) determining from the estimated cross line-of-sight relative velocity the values of predetermined system parameters to be used predictively in the succeeding integration interval in forming the range/doppler image;

(c) displaying in a range versus azimuth coordinate frame the formed range/doppler image of the ship target;

(d) removing the isodop distortion in the formed range/doppler image and centering the displayed range/doppler image of the ship target;

(e) cursoring a designated range/doppler resolution cell of the displayed image of the ship target; and tracking from aperture to aperture the range and interferometrically determined azimuth of the designated resolution target cell;

(f) steering the pointing of the interferometer antenna boresight to provide radar illumination of the ship target;

(g) controlling the range sampling time so that corresponding range samples from pulse-to-pulse over the integration interval correspond to the same range increment of the ship target;

(h) applying to the cursor location on an aperture to aperture basis a tracking correction to compensate for the rotation of the ship about the axis orthogonal to both the relative cross line-of-sight velocity and the radar line-of-sight to the center of rotation tracking point of the ship target;

(i) including processing the received signals by:
  (1) measuring interferometrically the aximuth angle of the received signal in each doppler filter in each range bin;
  (2) plotting measured interferometric azimuth angle as a function of a predefined doppler cell index and and a predefined range cell index for all range and doppler cell indices;
  (3) fitting straight lines to the plotted doppler/azimuth angle distributions for each of the range bins; and
  (4) obtaining from predefined characteristics derived from the family of fitted straight lines an estimate of the net doppler producing cross line-of-sight velocity of the radar bearing aircraft relative to the ship; and (j) excluding any data points located outside of a prescribed threshold band about the straight line fit formed for all available data points of the doppler/azimuth angle distribution for each range bin; and refitting to the data after such exclusion.

8. In conjunction with an airborne synthetic aperture radar system having an interferometer antenna and a range versus azimuth display, a method for forming a range/doppler image having improved azimuth resolution of a ship target under the influence of sea state conditions comprising the steps of:

(a) processing the received signals from the scatterers comprising the ship target to obtain an estimate of the net doppler producing cross line-of-sight velocity of the radar bearing aircraft relative to the ship;

(b) determining from the estimated cross line-of-sight relative velocity the values of predetermined system parameters to be used predictively in the succeeding integration interval in forming the range/doppler image;

(c) displaying in a range versus azimuth coordinate frame the formed range/doppler image of the ship target;

(d) removing the isodop distortion in the formed range/doppler image and centering the displayed range/doppler image of the ship target;

(e) cursoring a designated range/doppler resolution cell of the displayed image of the ship target; and tracking from aperture to aperture the range and interferometrically determined azimuth of the designated resolution target cell;

(f) steering the pointing of the interferometer antenna boresight to provide radar illumination of the ship target;

(g) controlling the range sampling time so that corresponding range samples from pulse-to-pulse over the integration interval correspond to the same range increment of the ship target;

(h) applying to the cursor location on an aperture to aperture basis a tracking correction to compensate for the rotation of the ship about the axis orthogonal to both the relative cross line-of-sight velocity and the radar line-of-sight to the center of rotation tracking point of the ship target;

(i) including processing the received signals by:
  (1) measuring interferometrically the azimuth angle of the received signal in each doppler filter in each range bin;
  (2) plotting measured interferometric azimuth angle as a function of a predefined doppler cell index and a predefined range cell index for all range and doppler cell indices;
  (3) fitting straight lines to the plotted doppler/azimuth angle distributions for each of the range bins; and
  (4) obtaining from predefined characteristics derived from the family of fitted straight lines an estimate of the net doppler producing cross line-of-sight velocity of the radar bearing aircraft relative to the ship;

(j) excluding any data points located outside of a prescribed threshold band about the straight line fit formed for all available data points of the doppler/azimuth angle distribution for each range bin; and refitting to the data after such exclusion;

(k) obtaining from predefined characteristics derived from the family of fitted straight lines an estimate of (1) the net doppler producing velocity in the direction orthogonal to the relative cross line-of-sight velocity and the radar line-of-sight to the center of rotation tracking point of the ship; and (2) the error in the line-of-sight velocity;

(l) removing using the estimated orthogonal velocity the isodop distortion in the formed range/doppler image of the ship target; and (m) centering using the estimated error in the line-of-sight velocity the displayed range/doppler image of the ship target.

9. In conjunction with an airborne synthetic aperture radar system having an interferometer antenna and a range versus azimuth display, a method for forming a range/doppler image having improved azimuth resolution of a ship target under the influence of sea state conditions comprising the steps of:

(a) processing the received signals from the scatterers comprising the ship target to obtain an estimate of the net doppler producing cross line-of-sight velocity of the radar bearing aircraft relative to the ship;

(b) determining from the estimated cross line-of-sight relative velocity the values of predetermined system parameters to be used predictively in the succeeding integration interval in forming the range/doppler image;

(c) displaying in a range versus azimuth coordinate frame the formed range/doppler image of the ship target;

(d) removing the isodop distortion in the formed range/doppler image and centering the displayed range/doppler image of the ship target;

(e) cursoring a designated range/doppler resolution cell of the displayed image of the ship target; and tracking from aperture to aperture the range and interferometrically determined azimuth of the designated resolution target cell;

(f) steering the pointing of the interferometer antenna boresight to provide radar illumination of the ship target;

(g) controlling the range sampling time so that corresponding range samples from pulse-to-pulse over the integration interval correspond to the same range increment of the ship target;

(h) applying to the cursor location on an aperture to aperture basis a tracking correction to compensate for the rotation of the ship about the axis orthogonal to both the relative cross line-of-sight velocity and the radar line-of-sight to the center of rotation tracking point of the ship target;

(i) including processing the received signals by:
  (1) measuring interferometrically the azimuth angle of the received signal in each doppler filter in each range bin;
  (2) plotting measured interferometric azimuth angle as a function of a predefined doppler cell index and a predefined range cell index for all range and doppler cell indices;
  (3) fitting straight lines to the plotted doppler/azimuth angle distributions for each of the range bins; and
  (4) obtaining from predefined charateristics derived from the family of fitted straight lines an estimate of the net doppler producing cross line-of-sight velocity of the radar bearing aircraft relative to the ship;

(j) excluding any data points located outside of a prescribed threshold band about the straight line fit formed for all available data points of the doppler/azimuth angle distribution for each range bin; and refitting to the data after such exclusion;

(k) obtaining from predefined characterisitcs derived from the family of fitted straight lines an estimate of (1) the net doppler producing velocity in the direction orthogonal to the relative cross line-of-sight velocity and the radar line-of-sight to the center of rotation tracking point of the ship; and (2) the error in the line-of-sight velocity;

(l) removing using the estimated orthogonal velocity the isodop distortion in the formed range/doppler image of the ship target;

(m) centering using the estimated error in the line-of-sight velocity the displayed range/doppler image of the ship target; and (n) tracking utilizing the range/doppler/azimuth angle measurement data obtained from all the scatterers comprising the ship target with substantially improved azimuth resolution the designated range/doppler resolution cell.

10. In conjunction with an airborne synthetic aperture radar system having an interferometer antenna and a range versus azimuth angle display, a method for forming and displaying a range/doppler image having improved azimuth resolution of a ship target under the influence of sea state conditions comprising the steps of:

(a) steering the pointing of the interferometer antenna boresight to provide radar illumination of the ship target;

(b) controlling the range sampling timing so that corresponding samples from pulse-to-pulse over the integration interval correspond to the same range increment of the ship target;

(c) compensating for phase variations in the received signals from the scatterers comprising the ship target resulting from the respective motions of the radar bearing aircraft and the ship;

(d) measuring interferometrically the azimuth angle of the compensated received signal in each doppler filter in each range bin;

(e) plotting measured interferometric azimuth angle as a function of a predefined doppler cell index and a predefined range cell index for all range and doppler cell indices;

(f) fitting in conjunction with a weighted least squares linear regression technique straight lines to the plotted doppler/azimuth angle distributions for each of the range bins;

(g) obtaining from selected regression constants derived from the family of fitted straight lines estimates of (1) the net doppler producing cross line-of-sight velocity of the radar bearing aircraft relative to the ship, (2) the net doppler producing velocity in the direction orthogonal to the relative cross line-of-sight velocity and the radar line-of-sight to the center of rotation tracking point of the ship, and (3) the error in the line-of-sight velocity;

(h) determining from the measured cross line-of-sight relative velocity the values of predetermined system parameters including synthetic aperture radar integration time and pulse repetition frequence and doppler filter bandwidths and spacings to be used predictively in the succeeding integration interval in forming the range/doppler image;

(i) displaying in a range versus azimuth angle coordinate frame the formed range/doppler image of the ship target;

(j) removing using the estimated orthogonal velocity the isodop distortion in the formed range/doppler image of the ship target; and (k) centering using the estimated error in the line-of-sight velocity the displayed range/doppler image of the ship target.

11. A method as recited in claim 10 including the further steps of cursoring a designated range/doppler resolution cell of the displayed image of the ship target; and tracking from aperture to aperture the range and interferometric azimuth angle of the designated resolution target cell.

12. A method as recited in claim 11 including the further step of applying to the cursor location on an aperture to aperture basis a tracking correction to compensate for the rotation of the ship about the axis orthogonal to both the relative cross line-of-sight velocity and the radar line-of-sight to the center of rotation tracking point of the ship.

13. A method as recited in claim 12 including the further steps of excluding any data points located outside of a prescribed threshold band about the straight line fit formed from all available data points of the doppler/azimuth angle distribution for each range bin; and refitting to the data after such exclusion.

14. A method as recited in claim 13 including the further step of tracking utilizing the range/doppler/azimuth angle measurement data obtained from all the scatterers comprising the ship target with substantially improved azimuth resolution the designated range/doppler resolution cell.

15. In combination with an airborne synthetic aperture radar system including a two section interferometer antenna operatively connected to the input of a two channel receiver and doppler processing system, and a display of range versus azimuth operatively connected to the output of said two channel receiver and doppler processing system, image signal processing means for forming and displaying a range/doppler image having improved azimuth resolution of a ship target under the influence of sea state conditions comprising:

(a) means for steering the pointing of the interferometer antenna boresight to provide radar illumination of the ship target;

(b) means for controlling the range sampling timing so that corresponding samples from pulse-to-pulse over the integration interval correspond to the same range increment of the ship target;

(c) means for
  (1) compensating for phase variations in the received signals from the scatterers comprising the ship target resulting from the respective motions of the radar bearing aircraft and the ship, and
  (2) centering using the estimated error in the line-of-sight velocity the displayed range/doppler image of the ship target;

(d) means for measuring interferometrically the azimuth angle of the compensated received signal in each doppler filter in each range bin;

(e) means for
  (1) plotting measured interferometric azimuth angle as a function of a predefined doppler cell index and a predefined range cell index for all range and doppler cell indices;
  (2) fitting in conjunction with a weighted least squares linear regression technique straight lines to the plotted doppler/azimuth angle distributions for each of the range bins; and
  (3) obtaining from selected regression constants derived from the family of fitted straight lines estimates of (i) the net doppler producing cross line-of-sight velocity of the radar bearing aircraft relative to the ship, (ii) the net doppler producing velocity in the direction orthogonal to the relative cross line-of-sight velocity and the radar line-of-sight to the center of rotation tracking point of the ship, (iii) the error in the line-of-sight velocity; and (4) excluding any data points located outside of a prescribed threshold band about the straight line fit formed from all available data points of the doppler/azimuth angle distribution for each range bin and means for refitting to the data after such exclusion;

(f) means for determining from the estimated cross line-of-sight relative velocity the values of predetermined system parameters including synthetic aperture radar integration time and pulse repetition frequency and doppler filter bandwidths and spacings to be used predictively in the succeeding integration interval in forming the range/doppler image;

(g) means for displaying in a range versus azimuth coordinate frame the formed range/doppler image of the ship target;

(h) means for removing using the estimated orthogonal velocity the isodop distortion in the formed range/doppler image of the ship target;

(i) means for (1) tracking from aperture to aperture the range and interferometrically determined azimuth of the designated resolution target cell;

(2) applying to the cursor location on an aperture to aperture basis a tracking correction to compensate for the rotation of the ship about the axis orthogonal to both the relative cross line-of-sight velocity and the radar line-of-sight to the center of rotation tracking point of the ship; and (3) tracking utilizing the range/doppler/azimuth angle measurement data obtained from all the scatterers comprising the ship target with substantially improved azimuth resolution the designated range/doppler resolution cell.

* * * * *

UNITED STATES PATENT AND TRADEMARK OFFICE
CERTIFICATE OF CORRECTION

PATENT NO. : 4,563,686
DATED : January 7, 1986
INVENTOR(S) : SOL BOLES

It is certified that error appears in the above-identified patent and that said Letters Patent is hereby corrected as shown below:

Col. 2, line 67, after "having" insert -- improved --

Col. 3, line 49, change "$\overline{\Delta \eta}$" to -- $\Delta \eta$ --
Col. 5, line 12, change "date" to -- data --
line 45, change "resolutin" to -- resolution --
Col. 6, line 22, change "$\Delta f'_d = 1/T \text{ tm } (14)$" to
-- $\Delta f'_d = 1/T$ (14) --
line 25, change "$tiN_p = Tf_r$" to -- $N_p = Tf_r$ -- line 63, change "$\Delta \Theta$" to -- $\overline{\Delta \Theta}$ --
Col. 7, line 19, delete "and,"

line 46, change "$(\Delta \Theta)i_f$" to -- $\overline{(\Delta \Theta)}i_f$ --
Col. 8 line 31, after "or" insert -- equivalently, --
line 32, delete "equivalently."

line 50, change "$V'_{yy}$" to -- $\tilde{V}'_{yy}$ --
Col. 9, lines 45 and 46, change "interferometrcially" to
-- interferometrically --

Col. 10, line 35, change "electro-magnetic" to -- electromagnetic --

Col. 11, line 33, change "$\Delta \Theta$" to -- $\overline{\Delta \Theta}$ --
Col. 12, line 58, change "if" to -- of --

UNITED STATES PATENT AND TRADEMARK OFFICE
CERTIFICATE OF CORRECTION

PATENT NO. : 4,563,686

DATED : January 7, 1986

INVENTOR(S) : Sol Boles

It is certified that error appears in the above-identified patent and that said Letters Patent is hereby corrected as shown below:

Column 16, line 46, change "aximuth" to -- azimuth --.

Signed and Sealed this

Twenty-fifth Day of November, 1986

*Attest:*

DONALD J. QUIGG

*Attesting Officer*      *Commissioner of Patents and Trademarks*